United States Patent [19]

Lett

[11] 4,309,053
[45] Jan. 5, 1982

[54] SPOILER FOR FLATBACK VEHICLES

[76] Inventor: Stephan C. Lett, 9103 Rockmore, Houston, Tex. 77064

[21] Appl. No.: 104,008

[22] Filed: Dec. 17, 1979

[51] Int. Cl.³ .............................................. B62D 35/00
[52] U.S. Cl. ....................................... 296/1 S; 296/91
[58] Field of Search .................................... 296/1 S, 91

[56] References Cited

U.S. PATENT DOCUMENTS

| 3,000,663 | 9/1961 | Lucchesi | 296/1 S |
| 3,010,754 | 11/1961 | Shumaker | 296/91 X |
| 3,072,431 | 1/1963 | Shumaker | 296/91 X |
| 3,090,645 | 5/1963 | Shumaker | 296/91 |
| 3,999,797 | 12/1976 | Kirsch et al. | 296/1 S |
| 4,159,843 | 7/1979 | Crossman | 296/91 X |

Primary Examiner—David M. Mitchell
Attorney, Agent, or Firm—Ranseler O. Wyatt

[57] ABSTRACT

A device to be mounted on the back of a flat back vehicle for directing the air flow from across the top of the vehicle downwardly over the back of the vehicle thus preventing the formation of the usual vacuum to the rear of the vehicle.

1 Claim, 3 Drawing Figures

SPOILER FOR FLATBACK VEHICLES

BACKGROUND OF THE INVENTION

Spoilers have been used on the rear end of vehicles for many years and in search of the records the patent to Schumaker U.S. Pat. No. 3,089,728 was found which is a unit designed to block the flow of water over the rear window of an automobile and to utilize at least a portion of the air flow to assist in washing this water across the rear window. Applicant's device is not designed to wash any rear windows but merely and solely to deflect the air flow from across the top of the vehicle to a direction vertical of the truck body, thus preventing a vacuum forming in the rear of the vehicle. Also was found patent to Heck U.S. Pat. No. 3,960,402 which consists of a series of vanes so mounted and so arranged to direct the flow of air from the top and sides of the vehicle to a point in the rear of the vehicle to avoid the formation of a vacuum. Applicant's device does not direct the air to a point to the rear of the vehicle but on the contrary directs it downwardly across the back end of the vehicle body.

SUMMARY OF THE INVENTION

An air flow deflector consisting of a convex-concave section of rigid material to be mounted on the rear and top of the vehicle body in a position to direct the air stream from across the top of the vehicle to a vertical path across the rear end of the vehicle, said device having longitudinal slots for adjustable mounting and having a notched area to permit free passage of the door latches when the rear doors are opened.

DESCRIPTION OF THE PREFERRED EMBODIMENT

Figure 1:
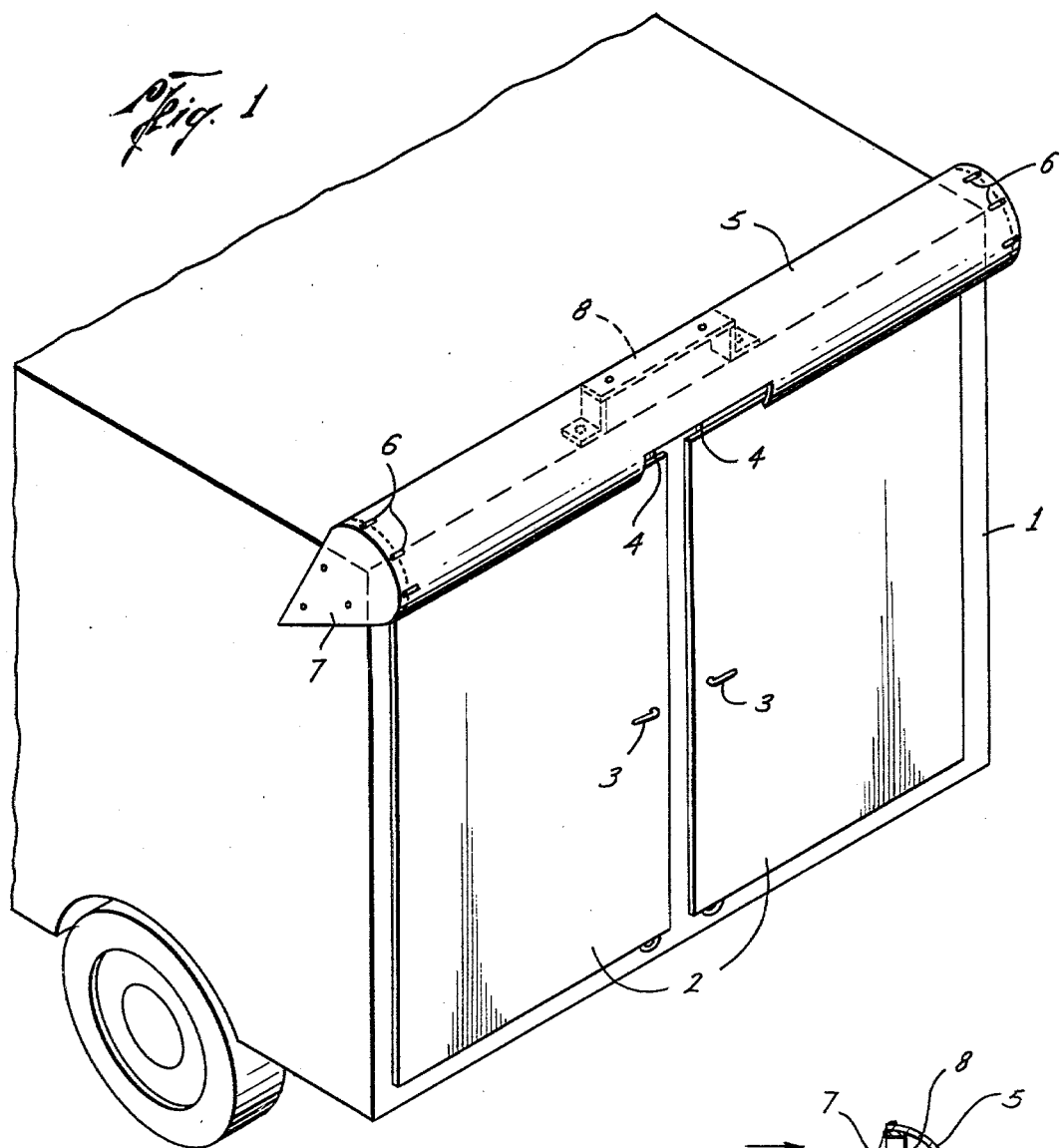
FIG. 1 is an elevational view of the rear end of the truck showing a device mounted thereon, with the center support shown in dotted lines.
Figure 2:
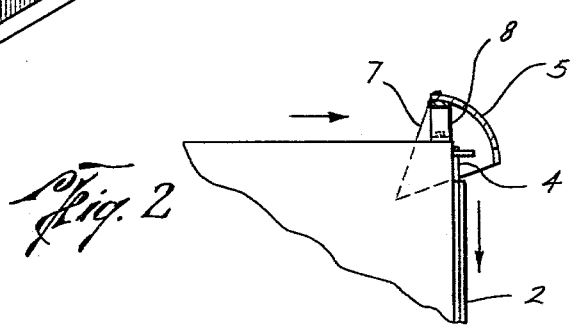
FIG. 2 is a cross-sectional view, in side elevation, of the device mounted on the truck body.
Figure 3:
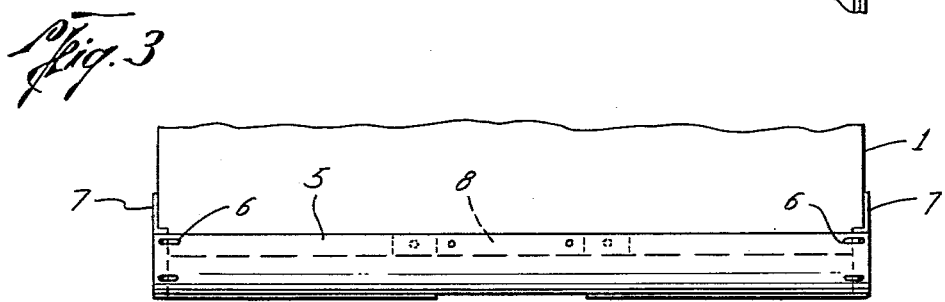
FIG. 3 is a top view of the device.

In the drawings, the numeral 1 designates a flat-bodied truck, such as those as having two outwardly opening rear doors 2, 2 provided with the usual handles 3, 3 and latches 4, 4 extending upwardly into the top of the vehicle, into suitable latch receiving ports (not shown).

The deflector 5 is formed of a piece of concave-convex rigid material having elongated slots 6, 6 at each end to receive bolts therethrough which extend into the end members 7, 7 the slots permitting adjustments to various widths of vehicles. The substantially triangular end members 7, 7 are mounted on to the sides of the vehicle body and the deflector, when mounted on the end members, directs the air stream from the top of the vehicle downwardly across the rear end of the vehicle. A reinforcing member 8, is mounted on the top of the vehicle midway of the vehicle sides and is anchored to and supports the center portion of the deflector 5. A notched area is formed in the lower most edge of the deflector to provide a passageway for the latch members 4 when the doors 2, 2 are opened.

The unit itself is simple and easy to mount on the vehicle, by mounting the center piece with its outer margin on the rear edge of the vehicle top midway of the sides of the vehicle body which will assure the proper positioning of the deflector by the air stream while the vehicle is in motion.

When the vehicle is in motion, the air stream will be across the path of the vehicle from front to rear and as it contacts the deflector 5, it will be diverted directly downwardly across the face of the rear end of the vehicle, and thus will prevent the usual formation of a vacuum to the rear of the vehicle.

What I claim is:

1. The combination of a spoiler and flat back vehicle having outwardly opening rear doors comprising a concavo-convex rigid deflector of greater length than the width of the vehicle, and having end members mounted thereon and at right angles thereto, elongated slots adjacent each end of said deflector providing variable mounted means for vehicles of various widths, said vehicle is provided with outwardly opening rear doors, said doors having latch members extending upwardly into said truck body and wherein said deflector has a notch formed in the lower most margin thereof midway of the respective ends, to act in combination with said doors to provide clearance for said latch members when said doors are opened.

* * * * *